Nov. 7, 1967  S. D. WOOD  3,350,742

REMOVABLE LINER FOR A VENT PORT HOUSING

Filed March 4, 1966

United States Patent Office 3,350,742
Patented Nov. 7, 1967

3,350,742
REMOVABLE LINER FOR A VENT PORT HOUSING
Stanley David Wood, Kingston, Ontario, Canada, assignor, by mesne assignments, to E. I. du Pont de Nemours and Company, Wilmington, Del., a corporation of Delaware
Filed Mar. 4, 1966, Ser. No. 531,912
5 Claims. (Cl. 18—12)

ABSTRACT OF THE DISCLOSURE

A screw extruder with a vent port in the barrel having an easily-changeable tubular liner positioned inside the vent port housing.

This invention relates generally to the working of plastics and, more particularly, to an extrusion apparatus having a devolatilization port in the extruder barrel.

It is known that modifiers such as plasticizers, lubricants, dyes, pigments and the like can be blended with plastic materials in an extrusion apparatus. In these and other usages, it is highly desirable at some point in the extrusion apparatus to provide a devolatilization port through which gases formed by vaporization of moisture, solvents and low molecular weight monomer may escape. Such devolatilization ports are usually provided on the downstream side of a highly compressive or choke section of the extrusion apparatus. Normally, molten material per se does not rise up into the devolatilization port. However, due to upsets or other periodic changes, material does build up in the vent port. For molten materials such as nylon which degrade when maintained at elevated temperatures, it is not only necessary to prevent the degraded and caked polymer from falling back into the main stream but also imperative that the buildup be removed before it blocks the port.

The principal object of this invention is to provide for uninterrupted operation of an extrusion apparatus. A more particular objective is to provide for clearance of the vent port in a screw extruder without contaminating the molten polymer.

These and other objectives are accomplished in a screw extruder which includes a barrel provided with a vent port and a vent port housing. Within the housing, there is a removable tubular liner having one of its ends seated in the vent port.

Figure 1:
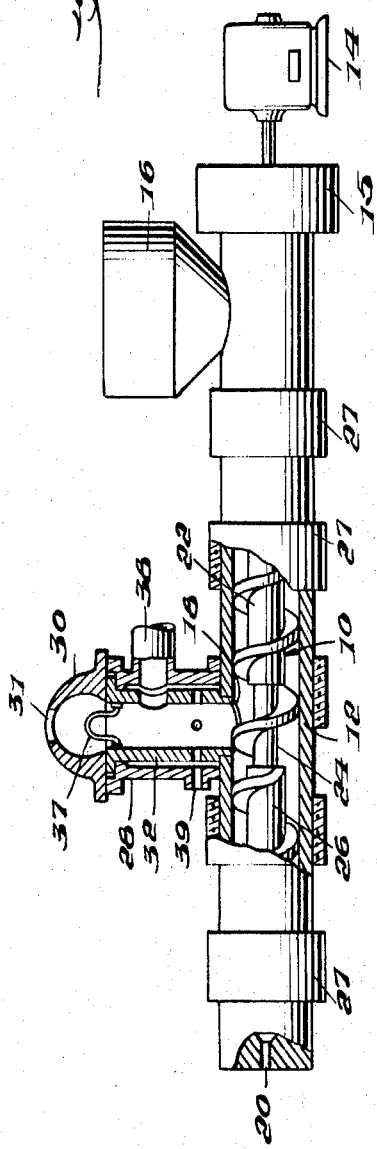
Figure 2:
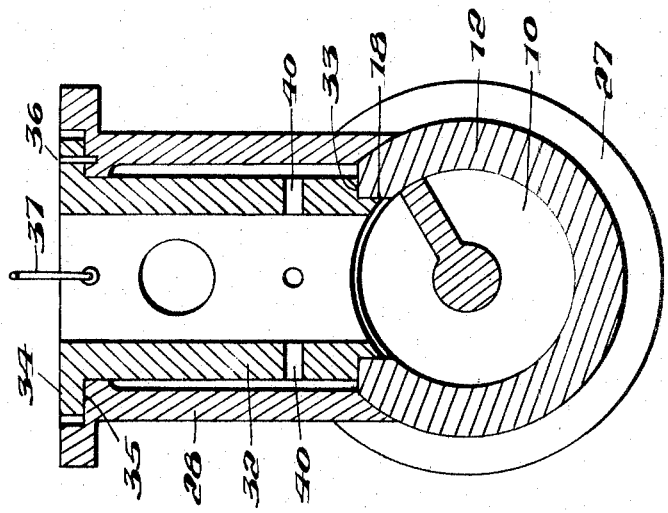

In the drawing, FIGURE 1 is a side elevational view in which parts have been broken away and shown in section to reveal details of construction. FIG. 2 is an enlarged transverse sectional view.

The extrusion apparatus chosen for purposes of illustration has a screw 10 in mating relationship with a barrel 12. Screw 10 is driven by motor 14 through a variable speed drive located in bearing housing 15. Barrel 12 has an inlet port beneath feed hopper 16, a devolatilization vent port 18 and an outlet 20. Screw 10 is made up in three lengths, a first compressive length 22 which extends nearly to the devolatiliztaion port 18, an intermediate length 24 which is below the devolatilization port and a second compressive length 26 which extends from just beyond devolatilization port 18 to outlet 20. In accordance with the usual practice, barrel 12 is equipped with a number of electrical band heaters 27.

Directly over vent port 18, there is a housing 28 which is welded or otherwise attached to barrel 12. Atop vent port housing 28 is a cover 30, flanged to housing 28 by bolts (not shown). A sight glass 31, in cover 30, permits visual inspection of a removable tubular liner 32.

Liner 32 has a reduced outside diameter at its inner end, presenting a shoulder 33 in seated engagement with barrel 12. The terminal end is shaped irregularly for substantial correspondence with the actual outline of port 18 and extends into close proximity with screw 10. At its outer end, liner 32 has a flange 34 which rests on an inside ledge 35 in housing 28. For purposes of rotational alignment, flange 34 is provided with a depending pin 36 and ledge 35 with a socket for the pin. Attached to the upper end of liner 32 is a handle 37. In the side of vent port housing 28, there is a vacuum port 38. Liner 32 has a matching hole such that there is direct communication between devolatilization port 18 and vacuum port 38. At a lower elevation, there is an inert gas inlet 39. Gas injected through inlet 39 fills the space between vent port housing 28 and liner 32 and enters the bore of the liner 32 through holes 40. If desired, housing 28 may be maintained at a desired temperature by an electrical band heater or by a fluid-heated jacket.

Polymer to be extruded is usually introduced through hopper 16 in the solid state. Heat input and compression in the first compressive length 22 are such that, by the time the polymer has reached intermediate length 24, it is in the molten state. Since the first compressive length 22 has a much larger root diameter than length 24, the latter is only partially full of polymer. Consequently, there is less pressure on the polymer and any volatile materials are vaporized. The polymer and vapor then pass under devolatilization port 18. To assist in removal of the vapor, vacuum is applied to port 38. The polymer then passes to second compressive length 26 which has a root diameter larger than length 24 but no larger than the root diameter of first compressive length 22. Outlet 20 may be connected directly to a die or to a pipe transferring the polymer to remote dies or spinning nozzles for the formation of fibers.

Theoretically, under proper operation, no molten polymer should rise through devolatilization port 18. However, the vapor does carry with it some vaporized monomer or polymer which condenses on the inner bore of liner 32. Furthermore, periodic upsets do cause molten polymer to rise into the bore of liner 32. When the operator detects a buildup of polymer by a visual inspection through sight glass 31 and determines that it is time to remove the caked polymer, he causes inert gas to flow through inlet 39, surround liner 32 and flow through holes 40. After removal of cover 30 and liner 32, a duplicate liner, which has previously been cleaned and prepared, is quickly inserted and cover 30 replaced. Since removal and replacement of a liner takes but a few minutes, the extrusion apparatus need not be stopped. Furthermore, the end product is not affected adversely since the inert gas blankets molten polymer in the intermediate section 24. This contrasts very favorably with previous methods which involve stopping the apparatus, removing the vent port housing and taking it to a remote cleaning area where it is either mechanically cleaned or the caked polymer is burned out. Alternatively, clean out has been accomplished with the housing in position by forcing deposited material into the main stream, as disclosed by Heidrich in U.S.P. 3,212,133. This requires that the product from the extrusion apparatus go to waste until all contaminated melt has cleared through the associated equipment. Both of these methods require either a shutdown or running to waste. Since devolatilization ports must be cleaned frequently, the reduction of time from hours to minutes results in considerable economies, both in manpower and in saved production. In other words, the improvements disclosed herein provide a simple, inexpensive and efficient route for maintaining processability of an extrusion apparatus at a high level.

In the illustrated embodiment, there is but one screw and one devolatilization port. It is, of course, obvious that a liner would be inserted in each of multiple devolatilization ports and that the presently disclosed vent port housing can be used in twin or multiple screw extruders.

Oftentimes, the amount of volatiles being released will automatically blanket the vent port and prevent air or other contaminants reaching the melt, in which event satisfactory control of melt viscosity can be maintained without an inert gas blanket. Where extreme control is desired and there are two or more vents, the other vents can be adjusted to compensate for opening one vent.

In some instances, it has been found advantageous to have an inwardly extending lip on the inside of the liner at its inner or seated end to prevent caked polymer from sliding down into the moving stream. This lip may be very small or it may occupy as much as 50% of the cross-sectional area of the bore of the sleeve.

Instead of a periodic inspection through sight glass 31, polymer buildup in the vent port can be monitored continuously by inserting a thermocouple into the bore of liner 32 to a point midway between barrel 12 and vacuum port 38. When the vent is clean, the signal from the thermocouple indicates a steady temperature. With a buildup of polymer, that signal changes rapidly, either up or down, depending on whether or not the sheath of polymer on the thermocouple touches the liner.

Additional modifications and variations will occur to those skilled in the art without departure from the spirit of the invention which accordingly is intended to be limited only by the scope of the appended claims.

Having thus described the invention, what is claimed as new and desired to be secured by Letters Patent is:

1. In a screw extruder including a barrel provided with a vent port and a vent port housing projecting from the barrel,
  a removable tubular liner positioned in said housing with one of its ends seated in said port.
2. The screw extruder of claim 1 wherein said seated end of the liner has a reduced outside diameter presenting a shoulder in seated engagement with said barrel.
3. The screw extruder of claim 2 wherein said housing is provided with internal ledge means, said liner has a flange at its outer end and said flange rests on said ledge means.
4. The screw extruder of claim 3 wherein said housing has a vacuum fitting, an open outer end and a cover for said outer end, said cover being removable to facilitate removal and replacement of said liner, the latter having a through hole opposite said fitting.
5. The screw extruder of claim 4 wherein said cover engages said flange and holds it in engagement with said ledge means when in place on the housing, said flange and the ledge means having parts cooperating to locate said liner rotationally with respect to the housing.

References Cited

UNITED STATES PATENTS

| 2,434,707 | 1/1948 | Marshall. | |
| 3,023,456 | 3/1962 | Palfey | 18—12 |
| 3,158,900 | 12/1964 | Heston | 18—12 |
| 3,177,272 | 4/1965 | Plymale | 18—12 X |
| 3,199,147 | 8/1965 | Aykanian et al. | 18—12 |

WILLIAM J. STEPHENSON, *Primary Examiner.*